(Model.)

W. F. HAUSMAN.
MANUFACTURE OF EMERY WHEELS.

No. 539,868. Patented May 28, 1895.

Witnesses
A. W. Stipek
C. S. Loomis Jr.

Inventor
William F. Hausman
By James Shepard
Atty.

UNITED STATES PATENT OFFICE.

WILLIAM F. HAUSMAN, OF NEW BRITAIN, CONNECTICUT.

MANUFACTURE OF EMERY-WHEELS.

SPECIFICATION forming part of Letters Patent No. 539,868, dated May 28, 1895.

Application filed May 29, 1894. Serial No. 512,855. (Model.)

*To all whom it may concern:*

Be it known that I, WILLIAM F. HAUSMAN, a citizen of the United States, residing at New Britain, in the county of Hartford and State of Connecticut, have invented certain new and useful Improvements in the Manufacture of Emery-Wheels, of which the following is a specification.

My invention relates to improvements in the manufacture of emery wheels, and the product thereof, and the objects of my improvement are to produce a superior wheel in a cheap and efficient manner.

Figure 1:
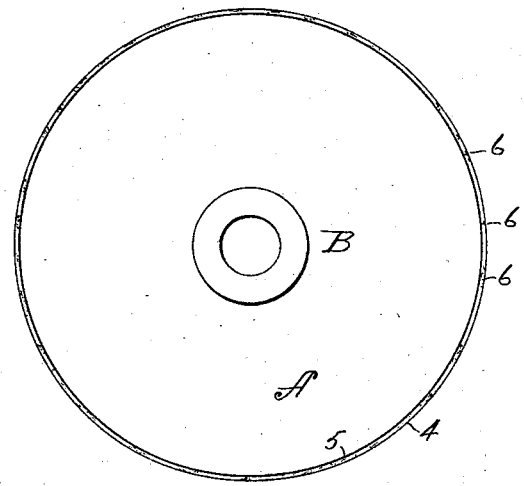
Figure 2:
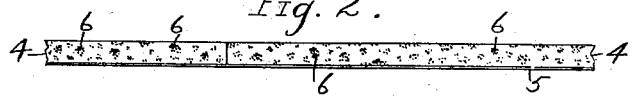

In the accompanying drawings, Figure 1 is a side elevation of a wheel made in accordance with my improvement. Fig. 2 is an edge view of a prepared strip for making into a wheel in accordance with my improvement; and Fig. 3 is a section of the peripheral or rim portion of a wheel made in accordance with my improvement, with the edges of the strips, instead of their broad side, arranged to form the periphery of the wheel.

A designates the body of a wheel having a suitable hub B, which hub and body may be constructed in any ordinary manner, the body being preferably of wood.

I take slabs or strips of cork 4 and glue them upon a reinforce 5 of cloth or any suitable textile material, and either before or after thus gluing the cork to the cloth, I fill all the interstices with a mixture of ground cork and glue, which should be thoroughly worked in so as to leave no large cavities or uneven places in the cork. Part of the filled interstices are designated by the reference numeral 6. The slabs of combined cork and cloth thus produced may be made of indefinite lengths and when they are designed to cover the periphery of the body of a wheel, as in Fig. 1, they may be glued thereto by gluing the cloth backing or reinforce 5 to the periphery of said body. The wheel is prepared for use by coating the cork surface with glue and emery in the ordinary manner.

Figure 3:
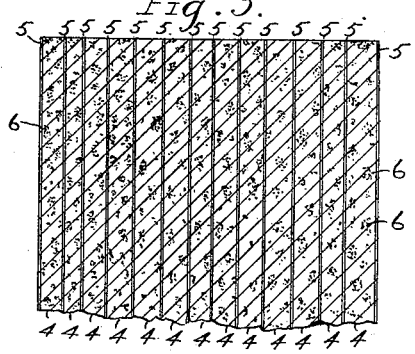

If desired, instead of covering the periphery of the body with the combined cloth and cork, the same may be made up into the working peripherial portion or rim of a wheel by gluing several layers together, as shown in Fig. 3, in which the top of said figure represents the periphery of the wheel, a portion of the rim of which is shown in section.

In Fig. 1, I have shown a suitable central hub and body of an ordinary construction in order to show one way of making a complete wheel but in Fig. 3 I have omitted the central portion of the wheel as it is wholly immaterial to my improvement what the central portion may be and the distinguishing feature of my invention resides in that portion of the wheel to which the emery is to be applied.

I prefer also to put a layer of cloth over the broad side of the last piece so that the cloth shall form both broad sides of the peripheral portion of the wheel, as shown, but whether the broad sides have a cork or a cloth surface is wholly immaterial, especially when the periphery of the wheel is designed to be coated with emery.

In either of the wheels shown, the holding surface to which the emery is glued is practically a solid surface of cork and it is so secured to the wheel as to form an efficient and durable wheel.

The form of wheel shown in Fig. 1 is more particularly adapted for polishing flat work, and the form of wheel shown in Fig. 3 is more particularly adapted for a wheel which has a grooved or ridged surface for polishing special work the periphery being turned to the required shape.

In order to properly fill the cork, it is best that the pieces should not be thick, but I do not wish to limit myself to any particular thickness, for the slabs or pieces of cork. When very thin slices of cork are used, they may be shaved off with a veneer cutter and may be made in long strips, but by filling with ground cork and glue, I am enabled not only to use long strips of material, but also to work up smaller and irregular shaped pieces, the space or spaces, if any, between the abutting edges of said pieces being filled with ground cork and glue so as to make the completed slabs practically solid cork.

I claim as my invention—

1. That improvement in the art of making emery wheels, which consists of cutting cork in slices or slabs, filling the interstices thereof with ground cork and glue, and gluing the same to a backing or support of cloth, then forming the wheel by gluing said cloth to a suitable support or body, substantially as described and for the purpose specified.

2. An emery wheel having a peripheral portion which consists of slices or slabs of cork having its interstices filled with ground cork and glue, and having also the backing or reinforce of cloth by means of which said slabs are glued upon the wheel, substantially as described and for the purpose specified.

WM. F. HAUSMAN.

Witnesses:
CHRIST HERMANN,
JAMES SHEPARD.